United States Patent [19]

Lodovico et al.

[11] Patent Number: 5,285,707
[45] Date of Patent: * Feb. 15, 1994

[54] TIRE CUTTING MACHINE

[75] Inventors: Frank J. Lodovico, Delmont; John W. Wagner, New Alexandria, both of Pa.

[73] Assignee: Allegheny Paper Shredders, Inc., Delmont, Pa.

[*] Notice: The portion of the term of this patent subsequent to Jan. 12, 2010 has been disclaimed.

[21] Appl. No.: 775,302

[22] Filed: Oct. 11, 1991

[51] Int. Cl.$^5$ .................... B23D 19/06; B26D 1/24
[52] U.S. Cl. ............................ 83/114; 83/176; 83/425.3; 83/500; 83/951; 83/955; 241/DIG. 31
[58] Field of Search ............... 83/19, 176, 113, 114, 83/121, 425.3, 425.4, 500, 951, 954, 955; 241/DIG. 31, 236, 166, 295

[56] References Cited

U.S. PATENT DOCUMENTS

| | | | |
|---|---|---|---|
| 2,770,302 | 11/1956 | Lee | 83/114 |
| 3,033,064 | 5/1962 | Lee | 83/114 |
| 3,931,935 | 1/1976 | Holman | 241/24 |
| 4,046,324 | 9/1977 | Chambers | 241/46.06 |
| 4,052,013 | 10/1977 | Ehrlich et al. | 241/101.2 |
| 4,068,805 | 1/1978 | Oswald | 241/159 |
| 4,134,556 | 1/1979 | Ehrlich et al. | 241/79.3 |
| 4,241,882 | 12/1980 | Baikoff | 241/236 |
| 4,374,573 | 2/1983 | Rouse et al. | 241/101.7 |
| 4,519,550 | 5/1985 | Rouse | 241/167 |
| 4,560,112 | 12/1985 | Rouse | 241/236 |
| 4,607,800 | 8/1986 | Barclay | 241/159 |
| 4,682,522 | 7/1987 | Barclay | 83/951 X |
| 4,684,070 | 4/1987 | Dicky | 241/79.3 |
| 4,684,071 | 4/1987 | Dicky | 241/80 |
| 4,729,515 | 3/1988 | Wagner | 241/236 X |
| 4,738,172 | 4/1988 | Barclay | 83/18 |
| 4,776,249 | 10/1988 | Barclay | 83/673 |
| 4,802,635 | 2/1989 | Barclay | 241/30 |
| 4,914,994 | 4/1990 | Barclay | 83/18 |
| 4,925,116 | 5/1990 | Lundell | 241/236 |
| 4,976,178 | 12/1990 | Barclay | 83/19 |
| 5,074,479 | 12/1991 | Lamar | 241/236 X |
| 5,178,336 | 1/1993 | Lodovico et al. | 241/99 |

FOREIGN PATENT DOCUMENTS

| | | |
|---|---|---|
| 249359 | 8/1911 | Fed. Rep. of Germany . |
| 1291606 | 3/1969 | Fed. Rep. of Germany . |
| 2526650 | 12/1976 | Fed. Rep. of Germany . |
| 2723281 | 12/1978 | Fed. Rep. of Germany . |
| 3231341 | 3/1984 | Fed. Rep. of Germany . |
| 3313231 | 10/1984 | Fed. Rep. of Germany . |
| 3413614 | 10/1985 | Fed. Rep. of Germany . |
| 45173 | 7/1935 | France . |
| 136597 | 10/1980 | Japan . |
| 232860 | 9/1988 | Japan . |
| 1333411 | 8/1987 | U.S.S.R. . |
| 1558423 | 1/1980 | United Kingdom . |

OTHER PUBLICATIONS

Destroyit—The Ideal Paper Shredders—24 pages.
Price List—Mar. 15, 1990–4 pages.
Conveyor 400 Production Shredders of GBC—2 pages.

Primary Examiner—Eugenia Jones
Attorney, Agent, or Firm—James L. Sherman

[57] ABSTRACT

A machine for cutting tires into a plurality of elongated strips includes parallel cutting shafts having a plurality of cutting wheels mounted for rotation therewith. The cutting wheels are separated by annular spacers on the cutting shafts. A spacer comber partially encircles each annular spacer and has a lower portion having a rounded surface to minimize surface contact between the elongated strips and the spacer comber. After the side cutting edges of each cutting wheel becomes worn, the cutting wheels can be sharpened by surface grinding which narrows the cutting wheel. Each annular spacer and spacer comber are also narrowed by respective corresponding surface grinding of the side surfaces thereof. The machine is overhauled, after the surface grinding and the corresponding surface grinding, by the addition of at least one of each cutting wheel, annular spacer and spacer comber on each cutting shaft.

6 Claims, 3 Drawing Sheets

TIRE CUTTING MACHINE

BACKGROUND OF THE INVENTION

1. Field of Invention

This invention relates to a machine which is capable of cutting a plurality of tires into elongated strips and, more specifically, such a machine which includes a cutting wheel configuration which can be readily overhauled when the cutting wheels begin to wear and the efficiency of the machine decreases.

2. Description of the Prior Art

While there exists numerous machines which will rip and shear discarded tires, they often require significant power to properly cut the tires and generate excessive heat during the cutting of the tires. Because of the heat generated, some machines include means for adding cooling water to the cutting region to prevent overheating of the cutting elements or the pieces of tire being cut.

One type of tire cutting machine, generally disclosed in U.S. Pat. Nos. 4,682,522; 4,738,172; 4,776,249; 4,802,635; 4,914,994; and 4,976,178, includes a configuration of cutting blades to segment the tire into specific parts. The cutting blades include removable sections or cutting edges which can be replaced and/or resharpened to restore the efficiency of the machine for cutting tires.

There are other tire cutting machines which appear to include rotating teeth configurations which tend to rip the tires. A plurality of overlapping cutting wheels are mounted on parallel shafts for rotation in opposite directions to also produce cutting or shearing at the overlapping edges of the cutting wheel. Such machines are generally disclosed in U.S. Pat. Nos. 4,046,324; 4,241,882; and 4,607,800; and British Patent No. 1,558,423. Some of these machines have very complicated teeth configurations and include means for replacement or resharpening of the cutting segments in order to overhaul the machine after extended use. The complicated tooth configuration of U.S. Pat. No. 4,241,882 allows cutting segments to be removed and replaced when they have become excessively worn through operation of the machine. U.S. Pat. No. 4,607,800 discloses two sets of rotating cutting wheels. The top set of cutting wheels appears to provide some ripping action for the tires or other material feed thereto. The bottom set of cutting wheels is said to primarily produce a transverse cut of the material passing therebetween. Both sets of cutting wheels include a form of replaceable wear shoe or tooth for overhauling the machine.

U.S. Pat. Nos. 4,374,573; 4,519,550; 4,684,070; and 4,684,071; and Russian Patent No. 1,333,411 disclose machines having overlapping cutting wheel configurations which are clearly intended to provide primary cutting at the side edges of the cutting wheels. Each of the machines disclosed therein appears to include a plurality of cutting and gripping plates which can be removed or replaced when excessively worn by cutting of material passing therethrough.

A similar machine, shown in U.S. Pat. No. 4,560,112, includes a plurality of cutting discs which have different thicknesses or widths in the axial direction. The cutting discs include cutting segments or teeth thereon which become worn with use. When the cutting segments are excessively worn, each segment is removed so that both side surfaces thereof can be ground to sharpen the edges. This reduces the overall thickness of the segment. The resulting narrower cutting segment can be reinstalled on the next smaller cutting wheel which has a narrower width or thickness in the axial direction. Accordingly, resharpening of the various cutting segments allows them to be progressively relocated on narrower cutting wheels with only one new set of such segments being needed for the widest cutting wheels in the array in the machine. The design of the machine in U.S. Pat. No. 4,560,112 demonstrates the need for any means which will facilitate the overhauling of such machines after extended use and wear.

The need for periodically sharpening cutting discs or wheels is also recognized in U.S. Pat. Nos. 4,052,013 and 4,134,556. The machines disclosed therein clearly employ cutting discs which overlap to provide side edge cutting of the material passing therethrough. Recognizing that the cutting discs will become dull after repeated use, these machines employed an installed grinding wheel configurations for each series of cutting wheels. The grinding wheel configuration may be used to simultaneously sharpen all the cutting wheels on the cutting wheel shaft of the series. However, each of the preferred cutting wheels disclosed therein includes a plurality of feeding teeth which are not intended to cut material directed to the machine but simply to assist in the feeding of the material to be cut at the edges of the cutting wheels. These feeding teeth must be specifically removed from the periphery of each of the cutting wheels prior to any grinding by the grinding wheel configuration.

U.S. Pat. No. 3,931,935 discloses other machines specifically adapted for cutting tires. The machines disclosed therein include two types of rotating cutting discs for cutting tires at the side edges thereof. One of the cutting discs includes circumferential cutting strips and a series of outwardly extending pegs on the outer surfaces thereof. The cutting strips and pegs must be replaced periodically in order to maintain the machine in a sharpened condition. Another cutting disc configuration employs a series of chrome strips for gripping and cutting. Again, these strips may be periodically replaced with sharpened strips in order to overhaul the cutting discs after extensive use.

The various configurations for the machines discussed hereinabove indicate a continuing concern for maintaining the cutting surfaces and edges of the cutting wheels in a condition for efficiently cutting the material passing therebetween. While replacement of or sharpening of the edges of the various cutting segments has been primarily discussed, other patents recognize the significant wear resulting from the use of such cutting wheel configurations. For example, German Offenlegungsschrift No. DE 3,413,614 includes a complicated tooth configuration and a complicated means for applying hard, wear-resistant metal to the cutting surfaces thereof.

One form of prior art paper cutting or paper shredding machine incorporates a configuration which has been employed to extend the life of the machine. For example, one type of paper shredder, sold under the registered trademark DESTROYIT, includes several models employing cutting blades having a standard thickness (for example, ⅛") and corresponding combers having a standard thickness (also about ⅛"). If the model of the paper shredder is to cut paper strips having a narrow, standard width, single cutting blades are installed on each shaft to extend between single cutting blades on the other shaft. A single standard comber is also installed between each of the cutting blades on the shaft to insure that the paper strips will be directed through the shredder.

However, if the paper is to be shredded into strips having a width which is twice the standard, a different model is employed using double cutting blades and double combers on each shaft. The two cutting blades together have a combined width which is twice the standard (in this case, ½"). Yet a different model could employ triple cutting blades and triple combers for cutting paper into strips having a width which is three times the standard (for example, ¾").

It has been found that the models using such multi-blade configurations could be overhauled to extend the life of the machine by rearranging the cutting blades as the cutting edges become dull. If a double blade configuration is employed, the life could be doubled by basically swapping the position of the two cutting blades on the shaft for each cutting component. If a triple cutting blade configuration is employed, the individual blades could be repositioned in order to triple the life of the machine as sharp, unused edges are positioned at the sides of the cutting components to replace the cutting edges which have become dull after extended use.

Clearly, there is a continuing concern for providing any cutting wheel configuration which is particularly adapted for refurbishing such machines after extended cutting of the tires.

Additionally, because of the need to improve the efficiency of tire cutting machines, any configuration which will facilitate the flow of material through the cutting area, reduce the friction created, and prevent undesired heating of the material and/or the cutting area is desirable. Generally, the use of rotating annular spacers between adjacent cutting wheels can be seen to urge the pieces of tire cut by the machine through the cutting section. The prior art machines disclosed in some of the patents discussed hereinabove include features which do not facilitate the most efficient flow of material through the cutting area.

For example, U.S. Pat. No. 4,519,550 includes guide fingers which are intended to move to "urge" the material through the cutting area but do not rotate to reduce the friction of the material passing therethrough. U.S. Pat. No. 4,560,121 includes a "floating" comber configuration which might facilitate the movement of the pieces through the cutting area but would generate significant heat because of friction produced by its movement within the cutting area. U.S. Pat. No. 4,046,324 includes a rotating annular spacer which would tend to urge the elongated pieces of tire through the cutting area but includes no means for preventing such pieces from rotating with the spacers to be collected at the backside of the shafts.

On the other hand, U.S. Pat. Nos. 3,931,935; 4,052,013; 4,134,556; and 4,241,882 and British Patent No. 1,558,423 disclose rotating annular spacers which include means for "stripping" or "combing" the material from the surface from the annular spacer to prevent collection at the remote side of the cutting shafts. However, not every "combing" or "stripping" means will effectively prevent the collection of pieces at the backside of the cutting shafts or insure that excessive friction is not generated by the "deflection" of pieces of tire from the rotating surface of the annular spacer.

In order to determine an effective way for preventing the collection of pieces of tire material in the cutting section of the machine without generating excessive heat, it is appropriate to analyze the types of combing means which have been employed in various types of cutting or shredding machines which may not be specifically adapted for the cutting and shredding of tires.

One group of such devices disclosed in prior art patents includes some form of combing means located at the backside of the spacer element between the cutting wheels. These spacer combers prevent the collection of pieces or strips of material between the cutting wheels at the backside thereof. Various cutting machines including such combing configurations are disclosed in U.S. Pat. No. 3,931,935; British Patent No. 1,558,423; German Patentschrift No. 249,359; German Auslegeshrift No. 1,291,606 and German Offenlegungsschrift Nos. 2,526,650; 2,723,281; 3,231,341; and 3,313,321.

All of the devices disclosed in these patents are characterized by the inclusion of some type of separate or integrally formed annular spacer ring between adjacent cutting wheels or discs on a shaft. The annular spacer ring tends to serve as a rotating comber for the aligned cutting wheel or disc on the other shaft. As a result, the pieces or strips of material are maintained in close proximity with the cutting wheel or disc by which they are formed. The spacer ring rotates in the direction of movement through the cutting area to generally facilitate the formation of the pieces or strips and their passage through the cutting area of the machine.

The devices disclosed therein are also characterized by the inclusion of a fixed "combing" means or "scraping" element which tends to prevent the collection of any material around the rotating spacer ring. The location of the fixed combing means at the lower or rear region of each spacer ring would prevent the collection of the strip or piece material at the backside of the spacer ring remote from the cutting area. However, as will be seen, the general shape and form of such combing means may not be satisfactory for the "combing" or "scraping" of pieces formed from tires because of the heat produced by friction between the pieces and the fixed combing means.

Another group of cutting or shredding machines also includes additional means for preventing the collection of pieces of material at the remote side of the cutting wheels themselves rather than simply at the remote or backside of the spacer ring. Such cutting or shredding machines are disclosed in U.S. Pat. No. 4,068,805; French Patent No. 45,173; and Japanese Patent Nos. 55-136597 and 63-232860. All of these machines apparently incorporate a solid comber block or backing member which occupies the space within the housing at the backside of both the rotating cutting wheels and the spacer rings therebetween. Such configurations will again tend to prevent most of the pieces or strips from being carried about the interior of the machine with the rotating cutting discs and spacers. To a greater or lesser degree, each of these prior art comber configurations will tend to prevent the collection of such pieces or strips in the region remote from the cutting area. However, as will be seen later, the particular configurations of the prior art combing devices aligned with the spacer rings do not entirely prevent the generation of undesired heat by the friction created between the pieces of tire and the fixed combing devices.

All of the U.S. and foreign patents mentioned hereinabove are incorporated by reference as if included in their entirety herein.

SUMMARY OF THE INVENTION

It is therefore an object of the invention to provide an improved tire cutting machine including a cutting wheel configuration which is capable of efficiently and reliably cutting a plurality of tires into elongated strips.

Another object of the invention is to provide such a machine which will efficiently pass the elongated strips through the cutting area thereof without producing excessive heat through friction between the components in the cutting area and the elongated strips of the tire material.

It is yet another object to provide such a machine which can be easily and conveniently overhauled when the side cutting edges of the cutting wheels thereof become dull after extended use of the machine.

These and other objects of the invention are provided in a preferred embodiment thereof including an improved machine capable of cutting tires into a plurality of elongated strips. The machine is of a type which includes a pair of parallel cutting shafts mounted for rotation about central axis thereof in opposite directions. Each of the cutting shafts supports a plurality of cutting wheels mounted for rotation therewith. Each of the cutting wheels on one cutting shaft axially separates and extends between axially adjacent cutting wheels on the other cutting shaft. An annular spacer is mounted on each cutting shaft between the axially adjacent cutting wheels on the cutting shaft for rotation therewith. The improvement includes each cutting wheel on each cutting shaft having a first half and a second half. Each of the first half and the second half has a first side cutting edge and a second side cutting edge. The first half and the second half of each cutting wheel is disposed in a first side-by-side manner on each cutting shaft with second side cutting edges thereof being in contact. The first side cutting edge of the first half of each cutting wheel on one cutting shaft and the first side cutting edge of the first half of one of the adjacent cutting wheels on the other cutting shaft are for producing a first elongated cut of the tire. The first side cutting edge of the second half of each cutting wheel on the one cutting shaft and the first side cutting edge of the second half of the other of the adjacent cutting wheels on the other cutting shaft are for producing a second elongated cut of the tire. The first elongated cut and the second elongated cut form one of the elongated strips therebetween.

The improved machine can also include the first half and the second half of each cutting wheel for being alternatively disposed in a second side-by-side manner on each cutting shaft with first side cutting edges thereof being in contact. The second side cutting edge of the second half of each cutting wheel on the one cutting shaft and the second side cutting edge of the second half of the one adjacent cutting wheel on the other cutting shaft would be for producing the first elongated cut of the tire. The second side cutting edge of the first half of each cutting wheel on the one cutting shaft and the second side cutting edge of the first half of the other adjacent cutting wheel on the other cutting shaft would be for producing the second elongated cut of the tire.

In the improved machine, each of the first half and the second half can include gripping teeth thereon. The gripping teeth can provide the first side cutting edge and the second side cutting edge.

The improved machine can further include the annular spacer having a cylindrical outer surface and a spacer comber for each of the annular spacers. Each spacer comber has a cylindrical inner surface. The spacer comber is fixedly mounted with the cylindrical inner surface aligned with the cylindrical outer surface of the annular spacer in a circumferential region thereof remote from a cutting area between the cutting shafts. The spacer comber has a lower portion disposed below the central axis and at a side thereof remote from the cutting area. The lower portion has a rounded surface, whereby the rounded surface minimizes surface contact between the elongated strips and the comber spacer.

The improved machine can include each of the first half and the second half of each cutting wheel is sharpened by surface grinding the first side cutting edge and the second cutting edge at side surfaces of each of the first half and the second half. Each of the first half and the second half and each cutting wheel including the first and the second halves are narrowed by the surface grinding. Each annular spacer and each spacer comber are narrowed by respective corresponding surface grinding of side surfaces thereof. The corresponding surface grinding would correspond to a total of the surface grinding of the first half and the second half in each cutting wheel. The improved machine is overhauled, after the surface grinding and the corresponding surface grinding, by the addition of at least one of each of the cutting wheels, the annular spacers, and the spacer combers on each cutting shaft.

Another preferred embodiment of the invention includes a machine for cutting tires into a plurality of elongated strips. The machine includes a pair of parallel cutting shafts mounted for rotation about central axis thereof in opposite directions. Each of the cutting shafts supports a plurality of cutting wheels mounted for rotation therewith. Each cutting wheel on one of the cutting shafts axially separates and extends between axially adjacent cutting wheels on the other of the cutting shafts. An annular spacer is mounted on each cutting shaft between axially adjacent cutting wheels on the cutting shaft for rotation therewith. Each cutting wheel on each cutting shaft includes a plurality of axial portions disposed in an axially adjacent, side-by-side manner along the central axis of the cutting shafts. Each of the axial portions of the plurality has a first side cutting edge and a second side cutting edge. The plurality of axial portions of each cutting wheel is for being selectively disposed in any one of a plurality of manners on the cutting shaft with the first side cutting edge of one of the axial portions at one side of each cutting wheel and the second side cutting edge of another of the axial portions at the other side of each cutting wheel. The first side cutting edge of one axial portion of each cutting wheel on the one cutting shaft and the first side cutting edge of the one axial portion of one of the adjacent cutting wheels on the other cutting shaft are for producing a first elongated cut of the tire. The second side cutting edge of another axial portion of each cutting wheel on the one cutting shaft and the second side cutting edge of the another axial portion of the other of the adjacent cutting wheels on the other cutting shaft are for producing a second elongated cut of the tire. The first elongated cut and the second elongated cut form one of the elongated strips therebetween.

The machine may also include each axial portion of the plurality in each cutting wheel being sharpened by surface grinding the first side cutting edge and the second cutting edge at side surfaces of each axial portion. Each of the axial portions and each cutting wheel including the axial portions are narrowed by the surface grinding. Each annular spacer is narrowed by respective corresponding surface grinding of the side surfaces thereof. The respective corresponding surface grinding corresponds to a total of the surface grinding of the plurality of axial portions in each cutting wheel. The machine is overhauled, after the surface grinding and the corresponding surface grinding, by the addition of at least one of each of the cutting wheels and the annular spacers on each cutting shaft. The machine can further include each axial portion of the plurality including gripping teeth thereon. The gripping teeth provide the first side cutting edge and the second side cutting edge.

The embodiment of the invention can include another machine for cutting tires into a plurality of elongated strips. The machine can include a pair of parallel cutting shafts mounted for rotation about central axis thereof in opposite directions. Each of the cutting shafts supports a plurality of cutting wheels mounted for rotation therewith. Each of the cutting wheels on one of the cutting shafts axially separates and extends between axially adjacent cutting wheels on the other of the cutting shafts. An annular spacer is mounted on each cutting shaft between the axially adjacent cutting wheels on each cutting shaft for rotation therewith. The annular spacer has a cylindrical outer surface. Each cutting wheel has a plurality of gripping teeth. The plurality of gripping teeth provides a first side cutting edge and a second side cutting edge for each cutting wheel. The first side cutting edge of each cutting wheel on the one cutting shaft and the first side cutting edge of one of the adjacent cutting wheels on the other cutting shaft are for producing a first elongated cut of the tire. The second side cutting edge of each cutting wheel on the one cutting shaft and the second side cutting edge of the other of the adjacent cutting wheels on the other cutting shaft are for producing a second elongated cut of the tire. The first elongated cut and the second elongated cut form one of the elongated strips therebetween. A spacer comber is for each of the annular spacers. The spacer comber has a cylindrical inner surface. The spacer comber is fixedly mounted with the cylindrical inner surface aligned with the cylindrical outer surface of the annular spacer in a circumferential region thereof remote from a cutting area between the cutting shafts. The spacer comber has a lower portion disposed below the central axis and at a side thereof remote from the cutting area. The lower portion has a rounded surface, whereby the rounded surface minimizes surface contact between the elongated strips and the comber spacer.

The machine can also include each cutting wheel being sharpened by surface grinding the first side cutting edge and the second cutting edge at side surfaces of each cutting wheel. Each cutting wheel is narrowed by the surface grinding. Each annular spacer and each spacer comber are narrowed by respective corresponding surface grinding of side surfaces thereof. The machine is overhauled, after the surface grinding and the corresponding surface grinding, by the addition of at least one of each of the cutting wheels, the annular spacers, and the spacer combers on each cutting shaft.

DESCRIPTION OF THE PREFERRED EMBODIMENT

Figure 1:
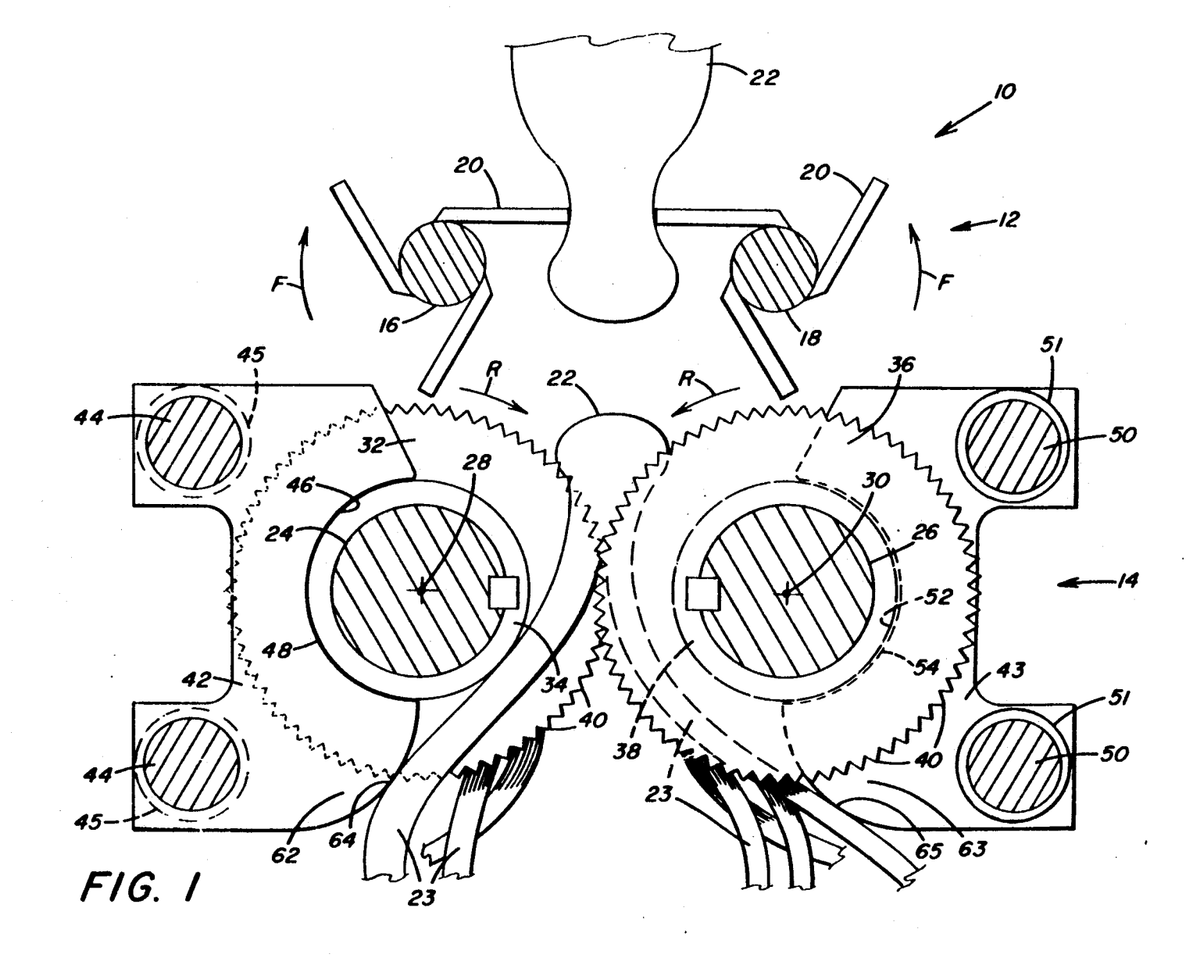
FIG. 1 is a sectional side view of the preferred tire cutting machine including various features of the invention.
Figure 2:
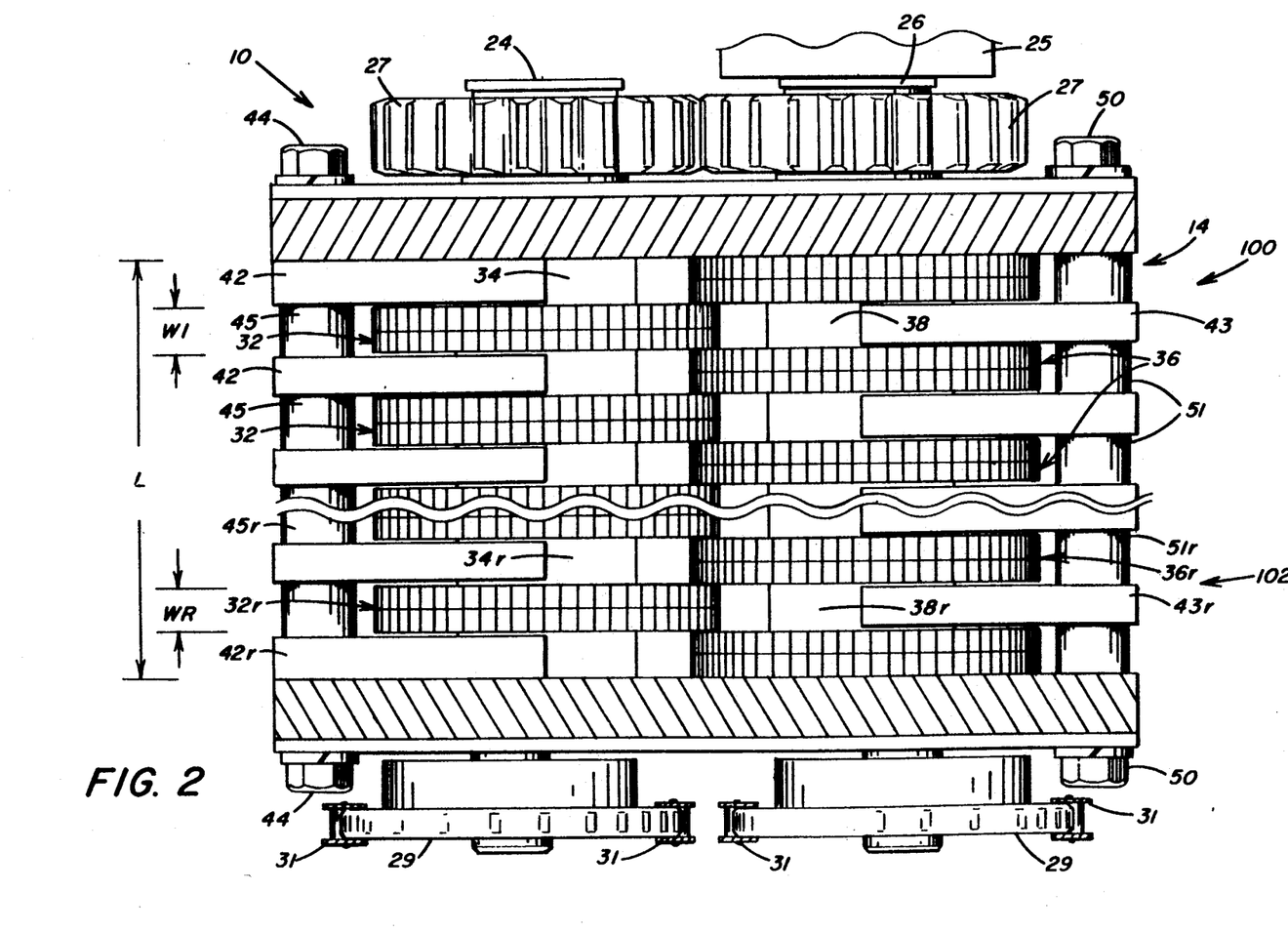
FIG. 2 is a fragmentary top view of the machine of FIG. 1, as seen generally along line II—II, with the top portion of FIG. 2 showing the machine prior to overhaul while the bottom portion of FIG. 2 shows the machine after being overhauled.

As seen in FIGS. 1 and 2, the preferred tire cutting machine 10, including various features of the invention, includes a feeding section 12 and a cutting section 14. The feeding section 12 includes a pair of rotating feed paddle configurations 16,18 which are mounted to rotate in opposite directions. Each of the feed paddle configurations 16,18 includes three longitudinally extending paddles 20 evenly dispersed around the cylindrical outer surface of the rollers 16,18. Accordingly, a tire 22 directed toward the paddle configurations 16,18 is entrapped between the paddle configurations 16,18 and advanced by the rotating paddles 20 toward the cutting section 14.

The cutting section 14 includes a pair of cutting shafts 24,26 respectively having a central axes 28,30 of rotation. The central axes 28,30 are parallel for rotation of the shafts 24,26 in opposite directions. One cutting shaft 26 is operably connected to a motor and reduction gear configuration 25 to produce rotation as indicated by the arrows R. Equal but opposite rotation is provided to the cutting shaft 24 by each of the cutting shafts 24,26 being connected by matching gears 27 at one end thereof. Accordingly, rotation of the cutting shaft 26 produces corresponding but opposite rotation of the other cutting shaft 24.

In fact, the same motor and reduction gear configuration 25 also produces corresponding rotation of each of the feed rollers 16,18 as indicated by the arrows F. Cutting shaft 24 includes a drive sprocket 29 on one end thereof. A driven sprocket (not shown) on the end of feed roller 16 is connected by chain 31 to the drive sprocket 29 to produce the rotation in the direction F corresponding to the rotation in the direction R. A similar drive sprocket 29, chain 31, and driven sprocket (not shown) are provided to the end of cutting shaft 26 and feed roller 18.

Cutting shaft 24 includes a plurality of cutting wheels 32 mounted thereon with adjacent cutting wheels 32 being separated by an annular spacer 34. The cutting wheels 32 and the annular spacers 34 are keyed to the cutting shaft 24 for corresponding rotation therewith. Cutting shaft 26 includes a plurality of cutting wheels 36 which are separated by annular spacers 38. Accordingly, cutting wheels 32 on cutting shaft 24 extend between adjacent cutting wheels 36 on cutting shaft 26 to form an overlapping array of cutting wheels 32,36 for cutting each tire 22 as it passes between the cutting shafts 24,26.

Each cutting wheel 32,26 includes a plurality of gripping teeth 40 about the peripheral surface thereof. The gripping teeth 40, preferably about sixty-nine on each cutting wheel, are identical and evenly dispersed around the periphery of the cutting wheels 32,36. The apexes of the teeth 40 are not intended to produce any transverse cutting but to grip the tire material as it is being cut by the side edges of the teeth of respective overlapping cutting wheels 32,36.

As a tire 22 is cut by the overlapping cutting wheels 32,36, a plurality of elongated strips 23 are formed. Efficient, smooth passage of the elongated pieces 23 through the cutting section 14 of the machine 10 is desirable to reduce friction in the cutting section 14 and between the cutting wheels 32,36. Any heat created by the friction could be detrimental to the effective operation of the cutting wheels 32,36, unduly heat the material of the elongated pieces 23 of the tire 22, and increase the energy required to cut the tires 22.

Because the annular spacers 34,38 rotate, they reduce friction and tend to advance the elongated pieces 23 through the cutting section 14. However, in order to prevent the elongated pieces 23 from passing around to the back or remote side of each of the shafts 24,26, a plurality of spacer combers 42,43 are provided. Specifically, the spacer combers 42 are mounted on comber rods 44 which are parallel to the central axis 28 of the cutting shaft 24. The comber rods 44 support the comber 42 to cause a cylindrical interior surface 46 thereof to be aligned with and closely encircle a cylindrical outer surface 48 of each of the annular spacers 34. The spacer combers 42 are separated from adjacent combers 42 by a plurality of rod rings 45 mounted on the comber rods 44. By a similar mounting configuration on comber rods 50, each of the spacer combers 43 includes a cylindrical interior surface 52 aligned with the cylindrical outer surface 54 of the annular spacers 38 on cutting shaft 26. A plurality of identical rod rings 51 are disposed on the comber rods 50 to separate adjacent spacer combers 43 thereon. With some of the elongated strips 23 tending to rotate with the cylindrical outer surface 48,54 of the respective annular spacers 34,38, the spacer combers 42,43 prevent continued rotation to the remote side of shafts 24,26. The rod rings 45,51 will maintain the spacer combers 42,43 in alignment between the cutting wheels 32,36 to prevent undesired contact with the cutting edges of the cutting wheels 32,36 which would tend to dull them.

As mentioned above, any number of combing configurations could by employed to prevent passage of such strips 23 to the remote side of the shafts 24,26. However, because of the high coefficient of friction of the material of the tires 22 and thus the elongated strips 23, excessive rubbing or scraping of the strips 23 from the cylindrical outer surface of the annular spacer should be avoided. With greater surface contact during the scraping and greater resistance to passage through the cutting section 14, excessive heat would be generated and the power required to cut the tires would be increased.

It should be noted that all of the prior art comber configurations discussed hereinabove and disclosed in the patents incorporated herein by reference include a lower portion which is intended to "comb" or "scrape" the elongated strips from the exterior surface of the rotating annular spacer rings is flat or planar. As a result, the pieces of tires or similar material which would be deflected from the exterior surface of the annular spacers would tend to rub or scrape along the extended flat, planar surfaces at these lower portions. Consequently, there would be a relatively large area for producing frictional contact between the elongated strips and the flat surface of the lower portion of the spacer combers.

On the other hand, as seen in FIG. 1, each of the spacer combers 42,43 include a lower portions 62,63 which is rounded. The rounded lower portions 62,63 is generally disposed below the central axes 28,30 and curves downwardly and outwardly toward the lower comber rod 44,50. As a result, the contact between the elongated strips 23 and the lower portions 62,63 is generally limited to line contact as generally indicated at 64,65. The line contact generally at 64,65 may be at varying or changing locations along the curved surface of the lower portions 62,63. The line contacts 64,65 is significantly less than the contact that would occur with the prior art spacer comber configurations which have a flat, planar surface on the lower portions thereof.

As mentioned hereinabove, the cutting of such tires into elongated strips tends to generate significant heat. The heating of the tire material could increase the coefficient friction of the material to generate more heat as the strips are deflected by the comber spacers. Accordingly, utilization of rounded surfaces on the lower portions 62,63 is even more significant by causing only line contact 64,65 between the elongated strips 23 and the spacer combers 42,43.

The preferred spacer comber configuration tends to reduce the liklihood of wear on the cutting edges of the cutting wheels 32,36. Specifically, preventing excessive generation of heat by the spacer combers 42,43 and maintaining of the alignment of the spacer combers 42,43 with the rod rings 45,51 tends to minimize the wear of the cutting edges on the cutting wheels 32,36.

However, the edges of the cutting wheels 32,36 will eventually wear after extended use of the machine 10. Although delayed or reduced by the configuration described hereinabove, the eventual wear of the cutting edges of the cutting wheels tends to elevate the power required for cutting the tires. Consequently, once the cutting edges become worn, some means must be provided to return them to a sharp, efficient condition.

The preferred machine 10 includes two features which allow the machine to be conveniently and effectively overhauled to restore cutting edges to a sharp condition for producing the elongated strips of the tires.

Figure 3:
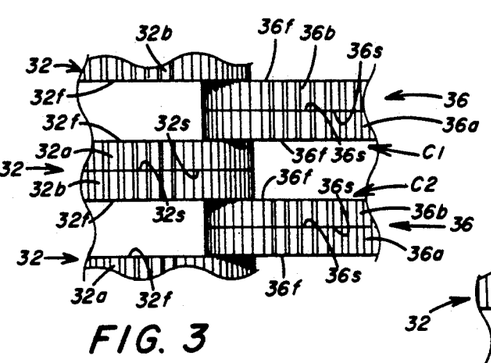
FIG. 3 is a fragmentary top view of the cutting area of the machine of FIG. 1 as the cutting wheels are initially installed.

The first feature includes forming each of the cutting wheels 32,36 with a first half and a second half disposed in a general side-by-side manner on the cutting shafts. As best seen in FIG. 3, each of the cutting wheels 32 includes a first half 32$a$ and a second half 32$b$. Similarly, each of the cutting wheels 36 includes a first half 36$a$ and a second half 36$b$. Each of the first halves 32$a$ and second halves 32$b$ of the cutting wheels 32 includes a first side cutting edge 32$f$ and a second side cutting edge 32$s$. Each of the first halves 36$a$ and second halves 36$b$ of the cutting wheels 36 include a first side cutting edge 36$f$ and a second side cutting edge 36$s$.

As seen in FIG. 3, when the machine 10 is initially configured, each of the first half 32$a$ and second half 32$b$ are disposed in a first side-by-side manner on the cutting shaft 24 with the second side cutting edges 32$s$ thereof being in contact. Similarly, each of the first halves 36a and second halves 36b of the cutting wheels 36 are disposed in a first side-by-side manner on the cutting shaft 26 with the second side cutting edges 36s being in contact. Consequently, the first side cutting edges 36f of the first half 32a of the cutting wheel 32 on cutting shaft 24 and the first side cutting edge 36f of the first half 36a on one of the adjacent cutting wheels 36 on the other shaft 26 are capable of producing a first cut C1 of the tire 22. Similarly, the first side cutting edge 32f of the second half 32b of the cutting wheel 32 on the cutting shaft 24 and the first side cutting edge 36f of the second half 36 of the other adjacent cutting wheel 36 on the other cutting shaft 26 produces a second cut C2 of the tire 22. As a result, the cutting wheel 32 cooperates with adjacent cutting wheels 36 to produce the first cut C1 and the second cut C2 to form an elongated strip 23 therebetween. Similar strips 23 are formed by each cutting wheel as it cooperates with the adjacent cutting wheels on the other shaft.

Specifically, in the preferred machine 10, the first halves 32a and second halves 32b and the first halves 36a and the second halves 36b include the gripping teeth 40 thereon. Accordingly, the edges of the gripping teeth 40 on each of the cutting wheels 32, 36 actually provide the first side cutting edges 32f, 36f and the second side cutting edges 32s, 36s. It should be clear that the wear of the side edges does not result in wear of the entire surface at the side of each of the halves of the cutting wheels 32, 36. In other words, simply the side edges at the gripping teeth 40 become dull and therefore less effective.

Figure 4:
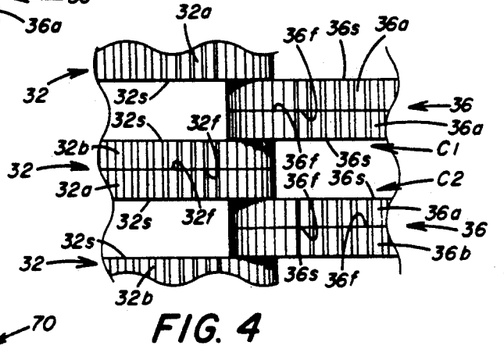
FIG. 4 is a view similar to that of FIG. 3 with the cutting wheels being reconfigured after extensive use.

As a result, after extensive wear of the first side cutting edges 32f, 36f, the machine 10 can be overhauled in order to increase the efficiency of the cuts produced by the cutting wheels 32, 36. As seen in FIG. 4, the machine 10 has been overhauled to direct the sharper side cutting edges of the cutting wheels 32, 36 to a position for cutting the tires 22. Specifically, each of the cutting shafts 24, 36 are removed from the machine for repositioning of the halves of the cutting wheels 32, 36 thereon. Each cutting wheel 32 includes the first half 32a and the second half 32b being disposed in an alternative, second side-by-side manner on the cutting shaft 24 with the dull, first side cutting edges 32f thereof being in contact. Similarly, the cutting wheels 36 are overhauled to include the first half 36a and the second half 36b disposed in an alternative second side-by-side manner on the cutting shaft 26 with the dull, first side cutting edges 36f being in contact. As a result, the second side cutting edge 32s of the second half 32b of the cutting wheel 32 on cutting shaft 24 and the second side cutting edge 36s of the second half 36b of one of the adjacent cutting wheels 36 on the other cutting shaft 26 produce the first cut C1 of the tire 22. Similarly, the second side cutting edge 32s of the first half 32a of each cutting wheel 32 on cutting shaft 24 and the second side cutting edge 36s on the first half 36a of the other adjacent cutting wheel 36 on the cutting shaft 26 produce the second cut C2 of the tire 22. Continued operation of the cutting wheel configuration as shown in FIG. 4 results in the machine 10 being overhauled to present sharp side cutting edges for the formation of the strips 23 of the tire 22 thereby. It should be clear that the disposition of the duller cutting edges to the interior of each of the cutting wheel 32,36 does not otherwise affect the operation of the machine 10. Accordingly, the effective life of the machine 10 is doubled by a simple mechanical overhaul and reorientation of the first halves and the second halves of the cutting wheels within the machine in the manner which was capable in the multi-blade cutting machines of the prior art which was discussed hereinabove.

Figure 5:
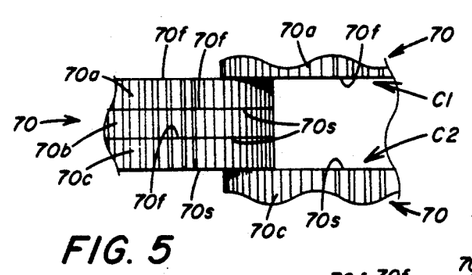
FIG. 5 is a fragmentary top view of a configuration of alternative cutting wheels as initially installed.
Figures 6, 7:
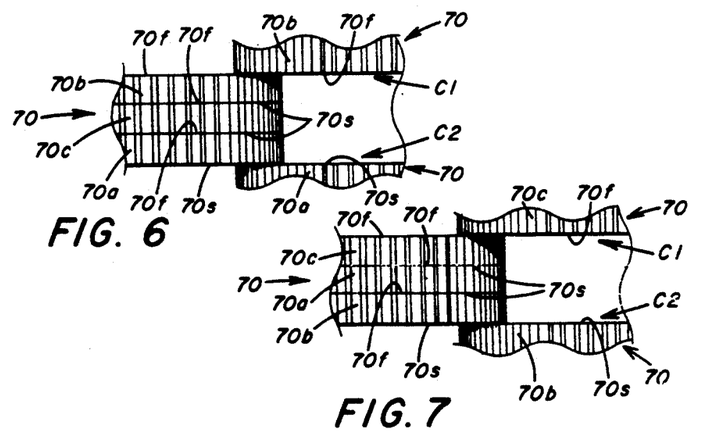
FIG. 6 is a view similar to that shown in FIG. 5 of the cutting wheels as disposed after extensive use.
FIG. 7 is a view similar to that shown in FIGS. 5 and 6 with the cutting wheels as disposed after further extensive use.

While the preferred machine 10 includes cutting wheels having a first half and a second half, it should be clear from the alternative embodiments shown in FIGS. 5, 6, and 7 that other cutting wheel configurations could be employed to even further extend the life of the machine 10 by simple mechanical overhauling thereof.

Each of the alternative cutting wheels 70 includes a first axial portion 70a, a second axial portion 70b and a third axial portion 70c. The axial portions 70a, 70b, 70c are disposed in an axially adjacent, side-by-side manner respectively along the central axes 28,30 of the shafts 24,26. Each of the axial portions 70a, 70b, 70c includes a first side cutting edge 70f and a second side cutting edge 70s. By orientation of the first axial portion 70a at one side of the cutting wheel 70 with the first side cutting edge 70f thereof disposed outwardly and the third axial portion 70c at the opposite side of the cutting wheel 70 with the second side cutting edge 70s disposed outwardly, the cutting wheels 70 are capable of producing similar cuts C1 and C2 therebetween.

As seen in FIG. 6, after the first side cutting edge 70f of the first axial portion 70a and the second side cutting edge 70s of the third axial portion 70c become worn, the axial portion 70a,70b,70c can be reoriented as seen in FIG. 6. Continued operation as seen in FIG. 6 will result in the first side cutting edge 70f of the second axial portion 70b and the second cutting edge 70s of the first axial portion 70a becoming worn. Consequently, after extended wear thereof, the machine can again be overhauled to provide the axial portion 70a,70b,70c as shown in FIG. 7. The cutting machine would then be capable of producing the first cut C1 at the first side cutting edge 70f of the third axial portion 70c while the second cut C2 would be produced at the second side cutting edge 70s of the second axial portion 70b As a result, if each of the cutting wheels 70 were to be a form of three axial portions 70a,70b,70c, the overall life of the cutting machine could be tripled by mechanically overhauling the machine twice to reorient the axial portions of the cutting wheels therein.

From the description provided hereinabove, it can be seen that the simple mechanical overhaul of preferred machine 10 and alternative machine can effectively extend the cutting life in a manner which was discussed hereinabove for the prior art machines employing multi-blade configurations. On the other hand, the preferred and alternative cutting machine should have an extended life even beyond that which can be produced by simple mechanical overhaul and reorientation of the axial portions of the cutting wheels therein. Consequently, the overall configuration of the preferred machine 10 includes means for sharpening the first and the second cutting edges thereof after both sets of cutting edges have become excessively worn. As seen in the upper portion 100 of FIG. 2, the array of cutting wheels 32,36 is configured as the machine 10 would be initially constructed for the cutting of the plurality of tires thereby. Each of the cutting wheels 32,36 would include the respective first halves 32a,36a and second halves 32b,36b. After the machine 10 is overhauled, the halves 32a,36a would be reoriented with respect to the second halves 32b,36b in order to effectively "double" the life of the machine. However, after further use of the machine 10, both of the first side cutting edged 32f,36f and the second side cutting edges 32s,36s would become worn.

As mentioned above, the wear of the first side cutting edges 32f,36f and the second side cutting edges 32s,36s will only dull the side edges of the gripping teeth 40 rather than extensive wear throughout the entire side surfaces of the first halves 32a, 36a and the second halves 32b, 36b. To sharpen the side cutting edges of the cutting wheels 32, 36, the halves 32a, 32b, 36a, and 36b are surface ground to provide a sharp edge at the gripping teeth 40 of each of the first side cutting edges 32f, 36f and the second side cutting edges 32s, 36s. Each half 32a, 32b, 36a, and 36b is narrowed by the surface grinding of both side surfaces thereof. The surface grinding will therefore result in a reduction of the initial width WI of each cutting wheel 32, 36 formed of the two halves to a reduced width WR which is less than the initial width WI. The proper selection of the amount of surface grinding and the resulting reduced width WR of each cutting wheel can result in the overall axial spacing of the machine 10 being reduced as generally demonstrated by the lower portion 102 in FIG. 2.

Accordingly, the lower portion 102 of the preferred machine 10, as shown in FIG. 2, includes an alternative configuration of cutting wheels 32r, 36r, which have each been formed of the halves which have been narrowed by the surface grinding to include a reduced width WR. The specific amount of the reduction in the width of each of the cutting wheels 32r, 36r is intended to result in the need for an additional cutting wheel 32r on the shaft 24 and an additional cutting wheel 36r on the shaft 26. Consequently, to reconfigure the entire machine 10 for an additional cutting wheel 32r and an additional cutting wheel 36r, corresponding surface grinding must be provided to each of the annular spacers 34,38; each of the spacer combers 42,43; and each of the rod rings 45,51. The corresponding surface grinding of each of these components corresponds to a total of the surface grinding of each half of each cutting wheel.

Selective and controlled surface grinding of each of these components by those skilled in the art will result in the overall length L of the machine 10 being maintained by adding another narrower cutting wheel 32r, a narrower annular spacer 34r, a narrower spacer comber 42r and a narrower pair of rod rings 45r for the cutting shaft 24. An additional narrower cutting wheel 36r, narrower annular spacer 38r, narrower spacer comber 43r, and a narrower pair of rod rings 51r can be employed for the cutting shaft 26. With the various components slightly narrowed and by the increase of one component for each of the shafts 24,26, the various cutting wheels 32r,36r are capable of including "sharpened" first side cutting edges 32f,36f and "sharpened" second side cutting edges 32s,36s to further increase the effective life of the machine 10. When the cutting wheels 32r,36r and associated components have been surface ground as shown in the lower portion 102 of FIG. 2, the cutting wheel halves can again be reoriented as necessary for extending the life of the machine with the narrower components therein.

The preferred machine 10 is particularly adapted for the surface grinding which would extend the life of the machine in a manner which is more efficient than could have been possible with the prior art machine discussed hereinabove which includes the multi-blade configuration. Specifically, the prior art machines also employed multi-comber components which have tended to further complicate the assembly of the machines. When such a machine is overhauled, all of the components must be removed from their corresponding shafts or support rods. Reassembly of multiple halves or axial portions is very time consuming. Although the multiple halves or axial portions may be necessary for the cutting blades, in order to effectively extend the life of these components by their reorientation on the shafts, the use of multi-spacers or multi-combers simply complicates the mechanical overhauling of the machine. Accordingly, the preferred machine 10 utilizes cutting wheel halves or axial portions but employs solid annular spacers and spacer combers which simplify the mechanical overhauling of the machine.

Additionally, the preferred use of such solid annular spacers and spacer combers is even more significant when the machine is to be overhauled by surface grinding of the side surfaces of the various components therein. Clearly, in order to extend the life of the cutting wheels themselves, both side surfaces of each cutting wheel half or cutting wheel axial portion must be surface ground in order to sharpen the cutting edges. On the other hand, if the machine includes multi-spacers or multi-combers, as found in the prior art, surface grinding of each of these components would unduly complicate the overhaul and be generally undesirable. Accordingly, the preferred machine 10 includes single components for the preferred annular spacers, spacer combers and rod rings in order to provide a simple surface grinding at only one side surface thereof. The single surface grinding reduces the overall width of the component by a single reduction step which corresponds to the total reduction of the width of the halves or axial portions of each cutting wheel. Clearly, the single surface grinding of a single component for each of the annular spacers, spacer combers and rod rings is simpler and more convenient than would be required for the surface grinding of multiple portions of such components. The preferred machine 10 therefore includes a configuration which is readily adapted for the mechanical overhauling method discussed hereinabove and for the additional overhauling which can be accomplished by the surface grinding of the cutting edges of the cutting wheels or the various halves or portions thereof.

Having basically explained the operation of the preferred machine 10, it is appropriate to include some examples of the dimensions of the preferred components thereof in order to better understand the overall operation for cutting tires. The preferred motor and reduction gear configuration includes an electric motor having a power of 20 HP to rotate at 1750 RPM. The reduction gear provides a 86.5 to 1 speed ratio for the cutting shaft. Accordingly, each of the cutting shafts rotates at approximately 20 RPM.

Each paddle configuration has a maximum diameter of about 8 inches. They are separated to provide a minimum distance therebetween of about 1.5 inches to about 2.5 inches.

The preferred cutting shafts have a diameter of about 4.810 inches. The preferred cutting wheels have a maximum diameter of approximately 11 inches while the preferred annular spacers have a maximum diameter of approximately 6 inches. Each of the halves of the preferred cutting wheels has an initial width of about 0.971 inches so that the initial width of each of the preferred cutting wheels is about 1.942 inches. The initial width of each annular spacer is about 1.944 inches. The distance between the center axis of the cutting shafts is about 10.4 to about 10.5 inches to provide an overlap of the cutting wheels of about 0.5 inches to about 0.6 inches.

The overall length of the preferred machine is about 37 inches. Accordingly, one of the cutting shafts would preferably include 10 cutting wheels while the other cutting shaft would include 9 cutting wheels. This plurality of 19 cutting wheels would be initially installed in the machine.

However, after surface grinding to sharpen the side cutting edges of the halves or axial portions of the cutting wheels, the overall thickness of the cutting wheels would be reduced. The preferred machine after being overhauled would include 11 cutting wheels on one shaft with 10 cutting wheels on the other shaft to provide an overall configuration of 21 cutting wheels. From the discussion provided hereinabove, it should be clear that there would initially be a corresponding number of annular spacers and spacer combers. The initial total number of 19 would be increased by one for each shaft to provide a total of 21 annular spacers and spacer combers after overhauling of the machine.

Clearly, from the description provided hereinabove, numerous alterations could be made to the preferred machines without departing from the scope of the invention as claimed.

What is claimed is:

1. An improved machine capable of cutting tires into a plurality of elongated strips, said machine being of a type which includes a pair of parallel cutting shafts mounted for rotation about central axes thereof in opposite directions, each of said cutting shafts supporting a plurality of cutting wheels mounted for rotation therewith, each of said cutting wheels on one of said cutting shafts axially separating and extending between axially adjacent said cutting wheels on the other of said cutting shafts, an annular spacer mounted on said each cutting shaft between said axially adjacent cutting wheels on said each cutting shaft for rotation therewith, wherein said improvement comprises:

said annular spacer having a cylindrical outer surface;
a spacer comber for each of said annular spacers;
said spacer comber having a cylindrical inner surface;
said spacer comber being fixedly mounted with said cylindrical inner surface aligned with said cylindrical outer surface of said annular spacer in a circumferential region thereof remote from a cutting area between said cutting shafts;
said spacer comber having a lower portion being disposed below said central axes and at a side thereof remote from said cutting area; and
said lower portion having a rounded surface which begins at said cylindrical inner surface and which extends uninterrupted downwardly from said cylindrical outer surface of said annular spacer to a location remote from said cutting area, whereby said rounded surface minimizes surface contact between said elongated strips and said spacer comber.

2. The improved machine according to claim 1, further including:
said each cutting wheel on said each cutting shaft including a first half and a second half;
each of said first half and said second half of said each cutting wheel having a first side cutting edge and a second side cutting edge;
said first half and said second half of said each cutting wheel being disposed in a first side-by-side manner on said cutting shaft with said second side cutting edge of said first half being in contact with said second side cutting edge of said second half;
said first side cutting edge of said first half of said each cutting wheel on said one cutting shaft and said first side cutting edge of said first half of one of said adjacent cutting wheels on said other cutting shaft for producing a first elongated cut of said tire in said first side-by-side manner;
said first side cutting edge of said second half of said each cutting wheel on said one cutting shaft and said first side cutting edge of said second half of the other of said adjacent cutting wheels on said other cutting shaft for producing a second elongated cut of said tire in said first side-by-side manner;
said first elongated cut and said second elongated cut forming one of said elongated strips therebetween;
said first half and said second half of said each cutting wheel for being alternatively disposed in a second side-by-side manner on said cutting shaft with said first side cutting edge of said first half being in contact with said first side cutting edge of said second half;
said second side cutting edge of said second half of said each cutting wheel on said one cutting shaft and said second side cutting edge of said second half of said one adjacent cutting wheel on said other cutting shaft for producing said first elongated cut of said tire in said second side-by-side manner; and
said second side cutting edge of said first half of said each cutting wheel on said one cutting shaft and said second side cutting edge of said first half of said other adjacent cutting wheel on said other cutting shaft for producing said second elongated cut of said tire in said second side-by-side manner.

3. The improved machine according to claim 2, wherein each of said first half and said second half of said each cutting wheel include gripping teeth thereon and said gripping teeth provide said first side cutting edge and said second side cutting edge.

4. The improved machine according to claim 2, wherein each of said first half and said second half of said each cutting wheel is configured to be sharpened by surface grinding said first side cutting edge and said second cutting edge at side surfaces of said each of said first half and said second half of said each cutting wheel;
said each of said first half and said second half and said each cutting wheel including said first half and said second half are configured to be narrowed by said surface grinding;
said each annular spacer and said each spacer comber are configured to be narrowed by respective corresponding surface grinding of side surfaces thereof, said respective corresponding surface grinding corresponding to a total of said surface grinding of said first half and said second half in said each cutting wheel; and
said improved machine is configured to be overhauled, after said surface grinding and said corresponding surface grinding, by the addition of at least one of each of said cutting wheels, said annular spacers, and said spacer combers on said each cutting shaft.

5. A machine for cutting tires into a plurality of elongated strips, said machine comprising:
a pair of parallel cutting shafts mounted for rotation about central axes thereof in opposite directions;

each of said cutting shafts supporting a plurality of cutting wheels mounted for rotation therewith;

each of said cutting wheels on one of said cutting shafts axially separating and extending between axially adjacent said cutting wheels on the other of said cutting shafts;

an annular spacer mounted on said each cutting shaft between said axially adjacent cutting wheels on said each cutting shaft for rotation therewith;

said annular spacer having a cylindrical outer surface;

said each cutting wheel having a plurality of gripping teeth;

said plurality of said gripping teeth providing a first side cutting edge and a second side cutting edge for said each cutting wheel;

said first side cutting edge of said each cutting wheel on said one cutting shaft and said first side cutting edge of one of said adjacent cutting wheels on said other cutting shaft for producing a first elongated cut of said tire;

said second side cutting edge of said each cutting wheel on said one cutting shaft and said second side cutting edge of the other of said adjacent cutting wheels on said other cutting shaft for producing a second elongated cut of said tire;

said first elongated cut and said second elongated cut forming one of said elongated strips therebetween;

a spacer comber for each of said annular spacers;

said spacer comber having a cylindrical inner surface;

said spacer comber being fixedly mounted with said cylindrical inner surface aligned with said cylindrical outer surface of said annular spacer in a circumferential region thereof remote from a cutting area between said cutting shafts;

said spacer comber having a lower portion being disposed below said central axis and at a side thereof remote from said cutting area; and said lower portion having a rounded surface which begins at said cylindrical inner surface and extends uninterrupted downwardly from said cylindrical outer surface of said annular spacer to a location remote from said cutting area, whereby said rounded surface minimizes surface contact between said elongated strips and said comber spacer.

6. The machine according to claim 5, wherein said each cutting wheel is configured to be sharpened by surface grinding said first side cutting edge and said second cutting edge at side surfaces of said each cutting wheel;

said each cutting wheel is configured to be narrowed by said surface grinding;

said each annular spacer and said each spacer comber are configured to be narrowed by respective corresponding surface grinding of side surfaces thereof; and said machine is configured to be overhauled, after said surface grinding and said corresponding surface grinding, by the addition of at least one of each of said cutting wheels, said annular spacers, and said spacer combers on said each cutting shaft.

* * * * *